US008036699B2

(12) United States Patent
Araki

(10) Patent No.: US 8,036,699 B2
(45) Date of Patent: Oct. 11, 2011

(54) AUDIO OUTPUT DEVICE, ITS ALARM OUTPUT CONTROL METHOD, AND ITS CONTROL PROGRAM

(75) Inventor: Daisuke Araki, Saitama (JP)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 11/885,299

(22) PCT Filed: Mar. 1, 2006

(86) PCT No.: PCT/JP2006/303868
§ 371 (c)(1),
(2), (4) Date: Aug. 29, 2007

(87) PCT Pub. No.: WO2006/093188
PCT Pub. Date: Sep. 8, 2006

(65) Prior Publication Data
US 2008/0137883 A1    Jun. 12, 2008

(30) Foreign Application Priority Data
Mar. 1, 2005   (JP) ................. 2005-056218

(51) Int. Cl.
*H04M 1/00* (2006.01)
(52) U.S. Cl. .......... 455/550.1; 455/575.3; 455/567; 455/219; 455/79; 381/104; 381/107; 381/343
(58) Field of Classification Search .......... 455/550.1, 455/79, 566, 567, 569.1, 575.3, 161.2, 183.2, 455/219, 220, 221, 556.1; 381/104, 107, 381/18, 28, 56, 60, 300, 343, 345, 312, 120, 381/374, 182; 345/173, 156, 158; 340/7.62, 340/540; 364/578; 250/342, 338
See application file for complete search history.

(56) References Cited

U.S. PATENT DOCUMENTS

| 5,224,151 | A | * | 6/1993 | Bowen et al. | ............... 455/569.1 |
| 5,926,400 | A | * | 7/1999 | Kytle et al. | ..................... 703/13 |
| 6,349,225 | B1 | * | 2/2002 | Lands et al. | ............... 455/575.3 |
| 7,031,761 | B2 | * | 4/2006 | Hunt et al. | ................. 455/575.2 |

(Continued)

FOREIGN PATENT DOCUMENTS
JP    04-207657    7/1992
(Continued)

OTHER PUBLICATIONS

Japanese Office Action with European translation of the relevant parts in the Office Action, JP 2005-056218, Date May 18, 2010.

*Primary Examiner* — Tan Trinh
(74) *Attorney, Agent, or Firm* — Scully, Scott, Murphy & Presser, PC

(57) ABSTRACT

It is possible to surely protect the user's ear from a sudden large volume and enable the user to surely and clearly hear a sound as information to be alarmed. In case an incoming call signal is received when the user holds a mobile telephone (1) at the speaking position and listens to a message output from an audio output unit (8), a control unit (17) makes a vibrator (27) generate a vibration as an alarm to call user's attention. At the timing when the user has sufficiently separated the mobile telephone (1) from his/her ear, the control unit (17) makes the audio output unit (8) output a ringtone of large volume. Thus, it is possible to surely protect the user's ear from a sudden large volume. Even when a music composition to notify the receipt of incoming call signal is used as a ringtone, the user can surely and clearly hear the sound as information to be alarmed.

22 Claims, 10 Drawing Sheets

U.S. PATENT DOCUMENTS

| | | | |
|---|---|---|---|
| 2005/0136949 A1* | 6/2005 | Barnes, Jr. | 455/461 |
| 2005/0192044 A1* | 9/2005 | Travis | 455/550.1 |
| 2005/0265565 A1* | 12/2005 | Sakemoto et al. | 381/123 |
| 2007/0173266 A1* | 7/2007 | Barnes, Jr. | 455/456.1 |
| 2010/0219937 A1* | 9/2010 | Heikes et al. | 340/7.62 |

FOREIGN PATENT DOCUMENTS

| | | |
|---|---|---|
| JP | 09-162772 | 6/1997 |
| JP | 09-247260 | 9/1997 |
| JP | 2000-286926 | 10/2000 |
| JP | 2003-078601 | 3/2003 |
| JP | 2003-188957 | 7/2003 |
| JP | 2004-064302 | 2/2004 |
| JP | 2004-146934 | 5/2004 |
| JP | 2004-179701 | 6/2004 |
| JP | 2004-242331 | 8/2004 |
| JP | 2004-304342 | 10/2004 |
| JP | 2004-341514 | 12/2004 |

* cited by examiner

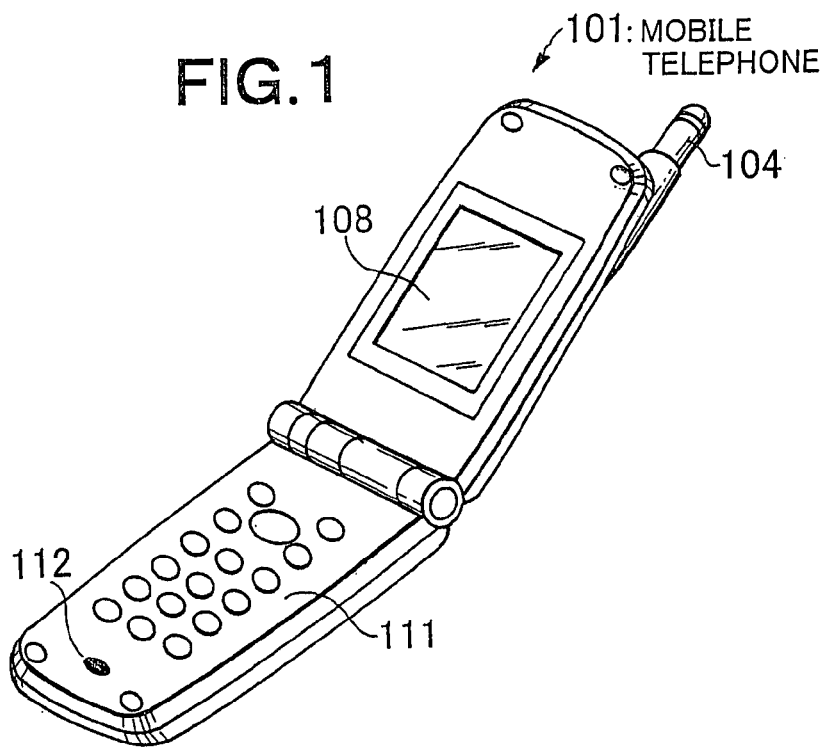
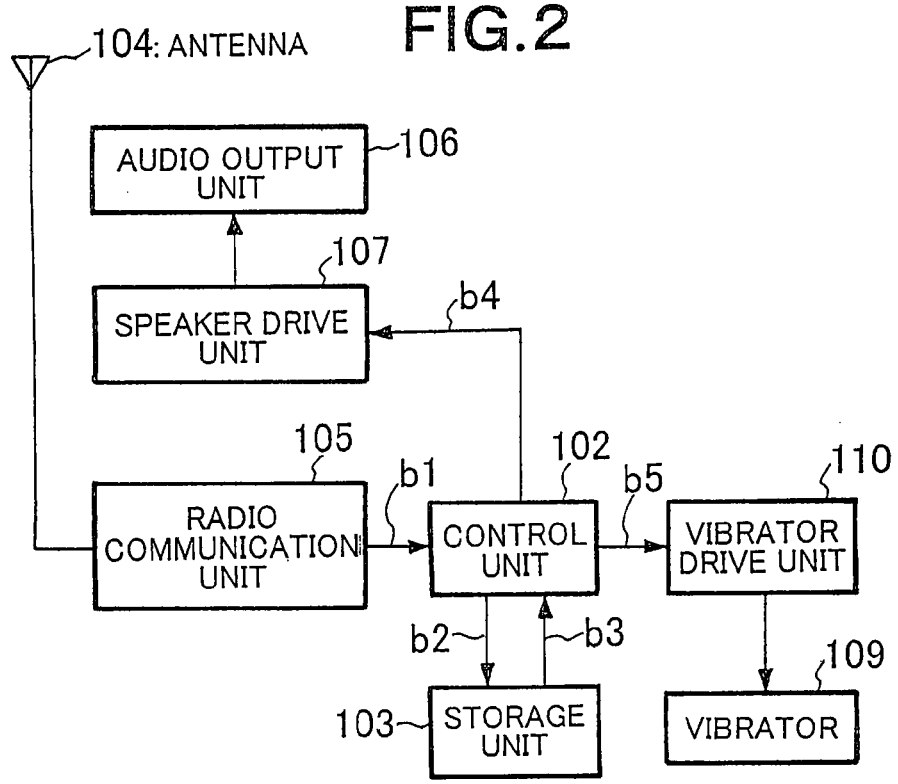

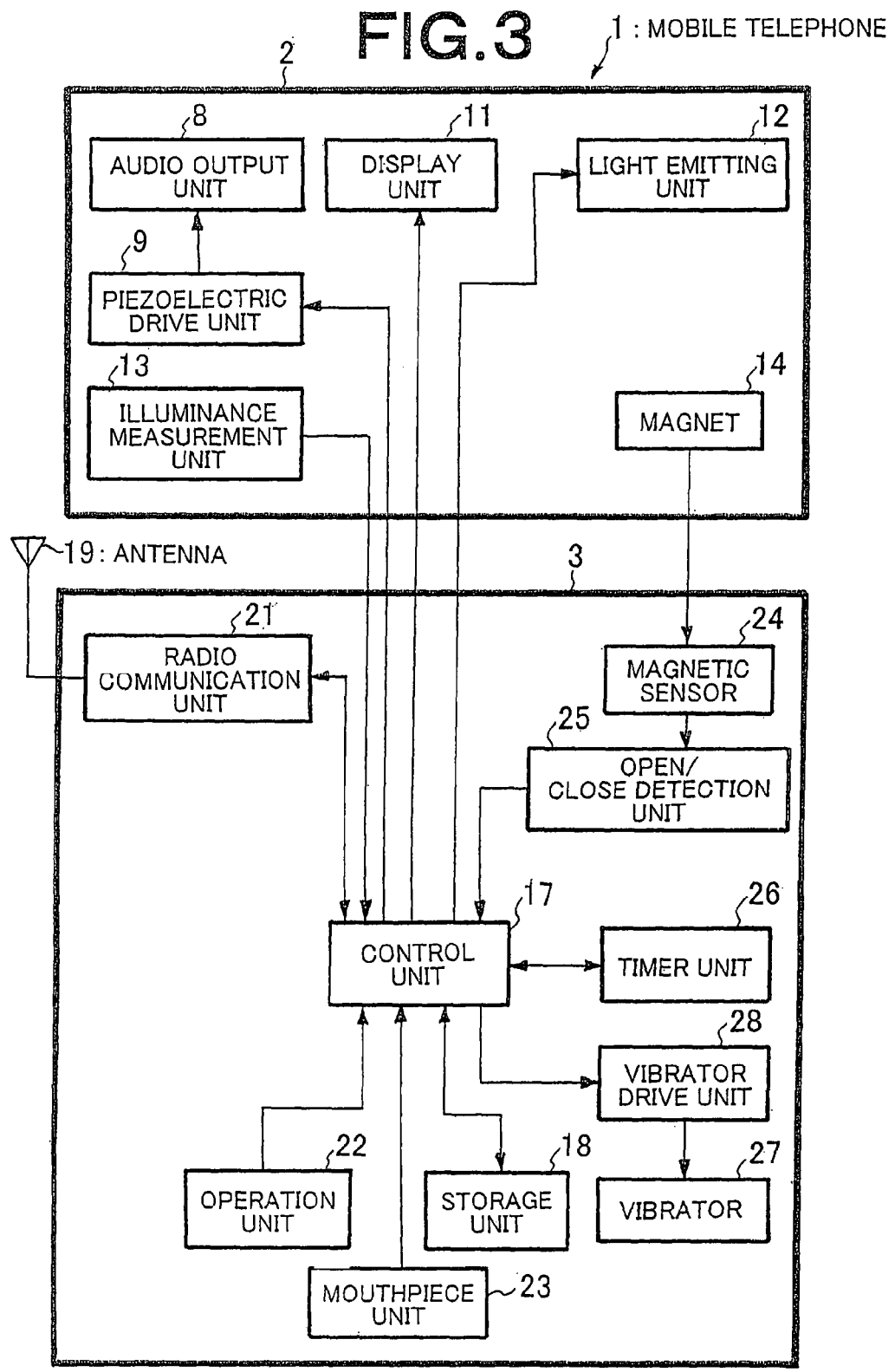

AUDIO OUTPUT DEVICE, ITS ALARM OUTPUT CONTROL METHOD, AND ITS CONTROL PROGRAM

TECHNICAL FIELD

The present invention relates to alarm output control in an audio output device such as a mobile telephone which has an electro-acoustic transducer provided with a function of outputting a sound of large volume such as a ringtone as well as a function of outputting a sound of small volume such as an earpiece sound.

BACKGROUND ART

In recent years, due to the high convenience of usability even when the user is in transit or out the door, portable devices provided with a function of outputting a sound such as a mobile telephone are becoming widespread. Furthermore, mobile telephones provided with not only the original telephone call function but also the data communication function capable of transmitting and receiving an electronic mail or browsing a home page when connected to the Internet are becoming widespread.

Such a mobile telephone includes, in a housing thereof, an earpiece unit that outputs an earpiece sound, a display unit that is configured by a liquid crystal display, an operation unit that is configured by various operation keys, a mouthpiece unit that inputs a mouthpiece sound, an audio output unit that is configured by a small speaker which outputs a ringtone when receiving an incoming call signal and outputs a music composition when reproducing music compositions, and a storage unit that stores messages etc.

In thus configured mobile telephone, when receiving an incoming call signal, a ringtone is output from the audio output unit, and when the user pushes the speaking start key of the operation unit, speaking over the telephone becomes possible, and the user can hear an earpiece sound output from the earpiece unit by setting the earpiece unit to the user's ear.

Furthermore, a message etc. stored in the storage unit is output from the earpiece unit. For example, in case of enjoying a game etc. by executing a program which is downloaded from a site, the user watches the screen of the display unit and concurrently listens to a music composition or a sound output from the audio output unit.

On the other hand, there has been suggested an electro-acoustic transducer provided with a function of outputting an earpiece sound (receiver function) as well as a function of outputting a ringtone (speaker function), and an attempt is made to mount the electro-acoustic transducer to a mobile telephone so as to reduce the size and weight, and lower the cost of the mobile telephone by making the mounting space thereof smaller.

As the electro-acoustic transducer, employing a configuration in which a speaker unit for outputting a ringtone and a receiver unit for outputting an earpiece sound are unitedly formed (for example, refer to Patent Document 1), and applying a flat panel speaker that comes into practical use in displays of personal computers to a mobile telephone have been considered.

In the flat panel speaker, a screen member to protect the display panel is used as a diaphragm to radiate a sound, and a sound is output from the display screen. On the back side of the diaphragm, an actuator module having a piezoelectric element is mounted, which actuator module is in contact with the diaphragm so as to convey a vibration, and the actuator module vibrates the diaphragm to radiate a sound wave.

As shown in FIG. 1 and FIG. 2, a mobile telephone 101 of this configuration includes a control unit 102 that controls respective units of the main body of the mobile telephone, a storage unit 103 that stores control programs to be executed by the control unit 102 and various data, a radio communication unit 105 that transmits and receives a radio wave through an antenna 104 so as to perform the telephone call processing and data communication in accordance with a predetermined protocol, an audio output unit 106 that outputs an earpiece sound when the user speaks over the telephone and outputs a ringtone when receiving an incoming call signal, a speaker drive unit 107 that drives the audio output unit 106, a display unit 108 that is configured by a liquid crystal display, a vibrator 109 that notifies the receipt of incoming call signal by generating a vibration, a vibrator drive unit 110 that drives the vibrator 109, an operation unit 111 that is configured by various operation keys etc., and a mouthpiece unit 112 that inputs a mouthpiece sound.

The control unit 102 receives an incoming call signal b1 from the radio communication unit 105 (refer to FIG. 2), and judges whether calling performance setup information is set to outputting a ringtone or generating a vibration in case an incoming call signal is detected. That is, the control unit 102 sends a setup information read-in signal b2 to request the calling performance setup information to the storage unit 103, and receives calling performance setup information b3 from the storage unit 103.

In case thus read out calling performance setup information is set to outputting a ringtone, the control unit 102 sends a speaker drive start signal b4 to the speaker drive unit 107 so as to make the audio output unit 106 output a ringtone of large volume, while in case the calling performance setup information is set to generating a vibration, the control unit 102 sends a vibrator drive start signal b5 to the vibrator drive unit 110 so as to start up the vibrator 109.

However, in case of using an electro-acoustic transducer provided with the receiver function as well as the speaker function, it can be assumed that an incoming call signal is received when the user hears a message with the electro-acoustic transducer set to the user's ear, and a ringtone of large volume is suddenly output. Accordingly, in order to prevent a harm to the auditory sense of the user, there has been disclosed a technique in which, for example, in using a folding type mobile telephone, it is determined that the mobile telephone is being used when it is detected that the mobile telephone is in the opened state (extended state), and the volume of a ringtone is gradually made large (for example, refer to Patent Document 2).

It has also been considered that, by employing a technique of measuring the distance between the user and the mobile telephone and prompting a correction in case it is determined that the positional relationship therebetween is inappropriate (for example, refer to Patent Document 3), it is determined that the mobile telephone is being used in case the distance therebetween is equal to or less than a predetermined distance.

Patent Document 1: JP 2004-179701-A
Patent Document 2: JP 2004-146934-A
Patent Document 3: JP 2003-188957-A

DISCLOSURE OF THE INVENTION

Problems to be Solved by the Invention

However, a sound output from an electro-acoustic transducer (speaker etc.) cannot be surely and clearly heard with desirable sound quality. For example, as a sound of large volume, other than a simple acoustic signal such as a ringtone, in case of reproducing and outputting a downloaded music composition, there may be raised a fear that the user fails to hear the initial part of small volume.

It is therefore an object of the present invention to provide an audio output device, its alarm output control method, and its control program that can surely protect the user's ear from a sudden large volume, and enable the user to surely and clearly hear a sound as information to be alarmed with desirable sound quality.

Means for Solving the Problems

According to the present invention, there is provided an audio output device provided with an electro-acoustic transducer that converts an electrical signal to a sound wave and radiates thus generated sound wave, which includes: a sound control means for controlling the electro-acoustic transducer under any one sound mode of a small volume sound mode that outputs a sound with volume which is smaller than a predetermined value so as to hear a sound by setting the user's ear in close proximity to the electro-acoustic transducer, or a large volume sound mode that outputs a sound with volume which is larger than a predetermined value so as to hear a sound by setting the user's ear away from the electro-acoustic transducer; and an alarm output means for, before radiating a sound wave from the electro-acoustic transducer under the large volume sound mode, outputting an alarm to call user's attention so as to protect the user's ear.

The audio output device further includes: a proximity detection means for detecting the contact or close proximity within a range equal to or less than a predetermined distance of the ear with respect to the electro-acoustic transducer; and a proximity judgment means for, based on the detection result by the proximity detection means, judging whether or not the ear is in the proximity state under which the ear is in contact or in close proximity within a range equal to or less than a predetermined distance with respect to the electro-acoustic transducer, and in case it is determined that the ear is in the proximity state with respect to the electro-acoustic transducer, before radiating a sound wave from the electro-acoustic transducer under the large volume sound mode, the alarm output means outputs an alarm to call the user's attention so as to protect the ear.

ADVANTAGES OF THE INVENTION

According to the present invention, since the alarm output means outputs an alarm to call user's attention before a sound wave of large volume is radiated from the electro-acoustic transducer, the user's ear can be surely protected from a sudden large volume, and since a sound wave of large volume can be output without making the volume thereof smaller after outputting an alarm, the user can surely and clearly hear a sound and a music composition as information to be alarmed with desirable sound quality.

BRIEF DESCRIPTION OF THE DRAWINGS

FIG. 1 shows a view to describe the conventional technique;

FIG. 2 shows a view to describe the conventional technique;

FIG. 3 shows a block diagram indicative of the configuration of a mobile telephone of the first example according to the present invention;

DESCRIPTION OF THE SYMBOLS 1, 1A, 1B, 1C: Mobile telephone (audio output device)
8, 59: Audio output unit (electro-acoustic transducer)
9, 61, 81: Piezoelectric drive unit (sound control means)
11, 39, 62, 82: Display unit (display means)
12, 41, 63, 83: Light emitting unit (alarm output means, light emission means)
13, 84: Illuminance measurement unit (proximity detection means, illuminance measurement means)
14, 43, 65, 85: Magnet (Part of open/close detection means)
17, 44, 66, 86: Control unit (proximity judgment means, part of sound control and drive control means)
18, 45, 67, 87: Storage unit
21, 47, 69, 92: Radio communication unit (communication means)
24, 51, 73, 95: Magnetic sensor (Part of open/close detection means)
25, 52, 74, 96: Open/close detection unit (Part of open/close detection means)
27, 54, 76, 98: Vibrator (alarm output means)
28, 55, 77, 99: Vibrator drive unit (part of drive control means)
31: Liquid crystal display panel
32: Diaphragm
33: Actuator module
37: Audio output unit (electro-acoustic transducer)
38: Speaker drive unit (sound control means)
42: Pressure measurement unit (proximity detection means, pressure detection means)
64: Distance measurement unit (proximity detection means, distance measurement means)
79: Main audio output unit (electro-acoustic transducer)
88: Auxiliary audio output unit (electro-acoustic transducer)
89: Auxiliary speaker drive unit (drive control means)

BEST MODE FOR CARRYING OUT THE INVENTION

Hereinafter, the best mode of the present invention will be described in detail referring to the accompanying drawings.

First Example

Figure 4:
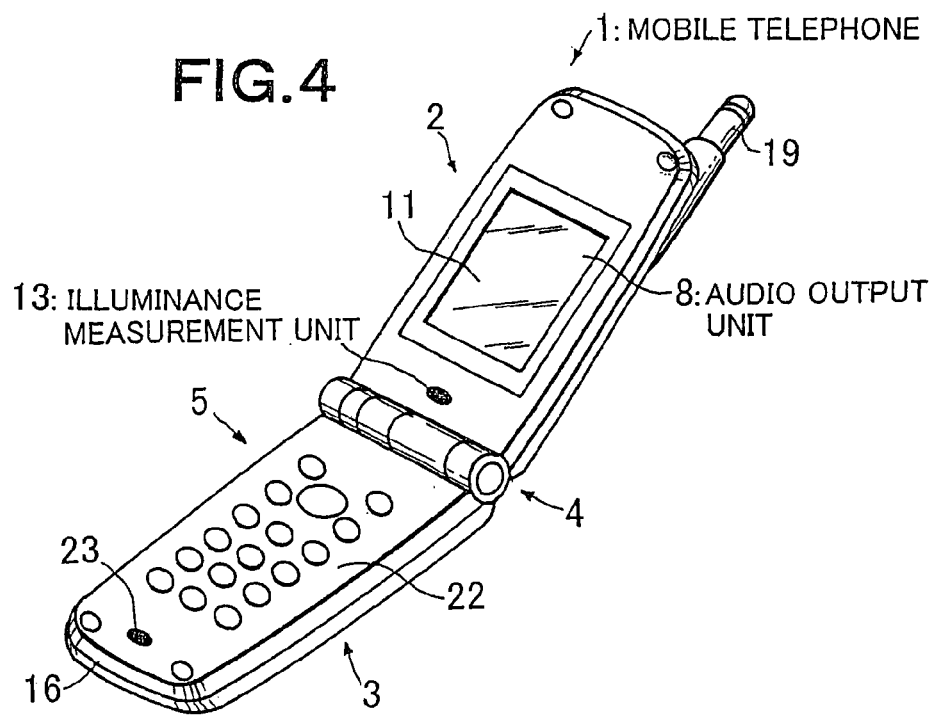
FIG. 4 shows a perspective view indicative of the configuration of the mobile telephone.
Figure 5:
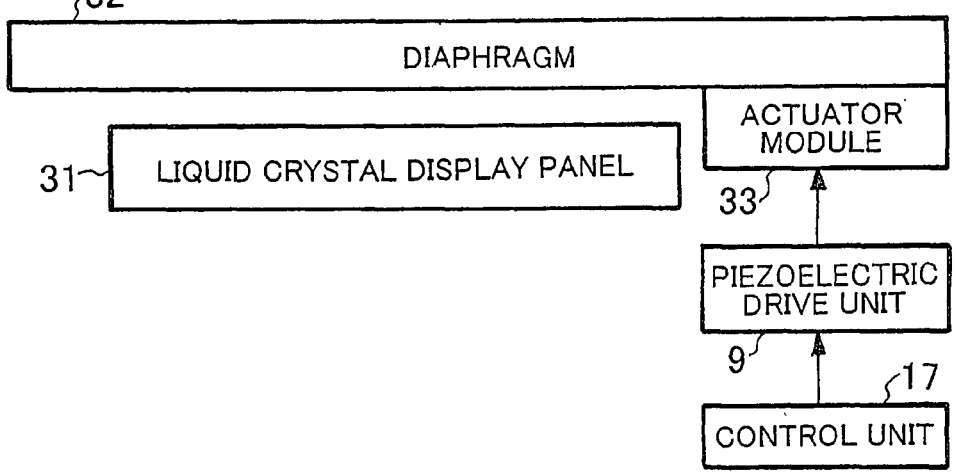
FIG. 5 shows a view to describe the configuration of an audio output unit of the mobile telephone.
Figure 6:
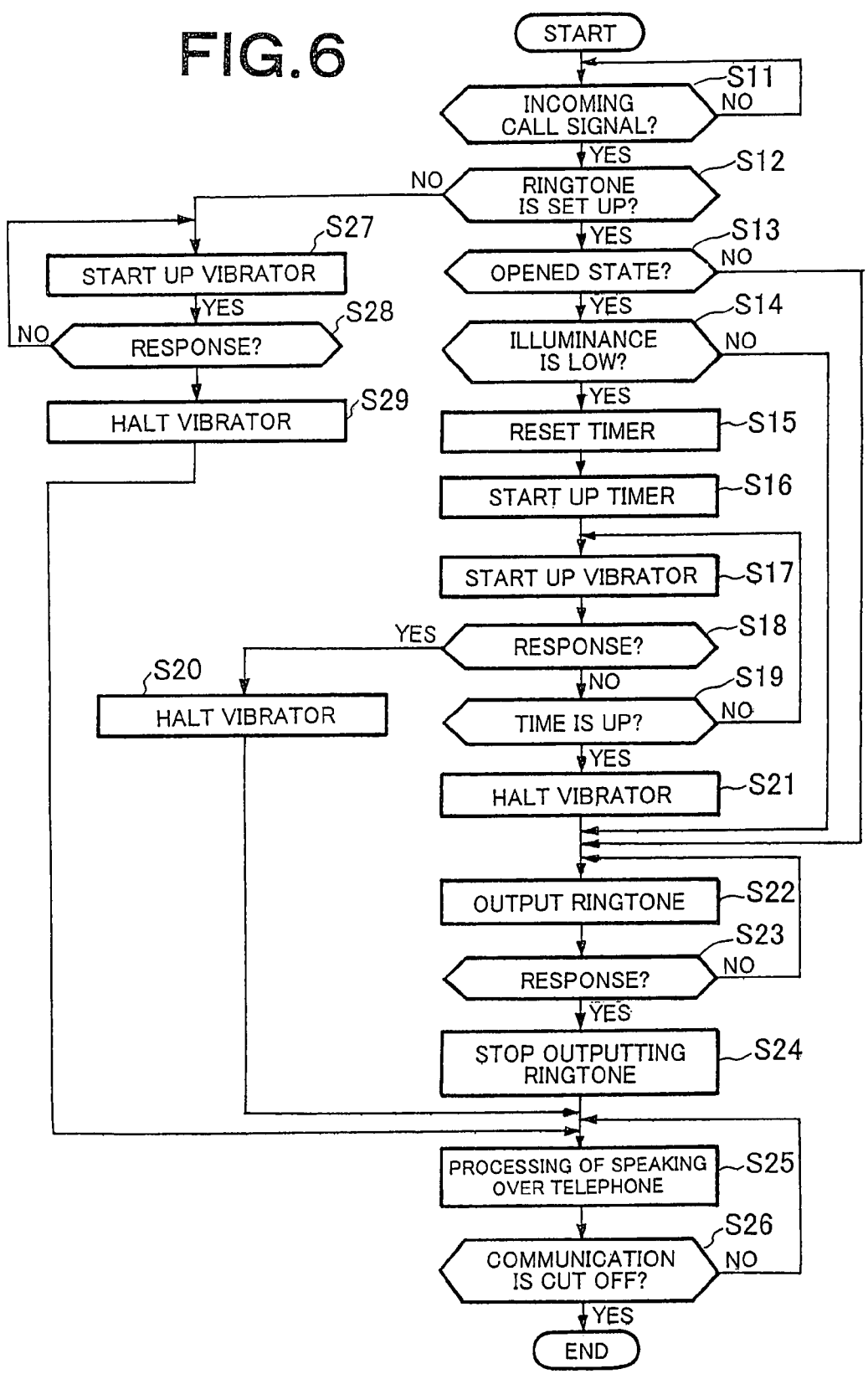
FIG. 6 shows a flowchart to describe the performance of the mobile telephone.
Figure 7:
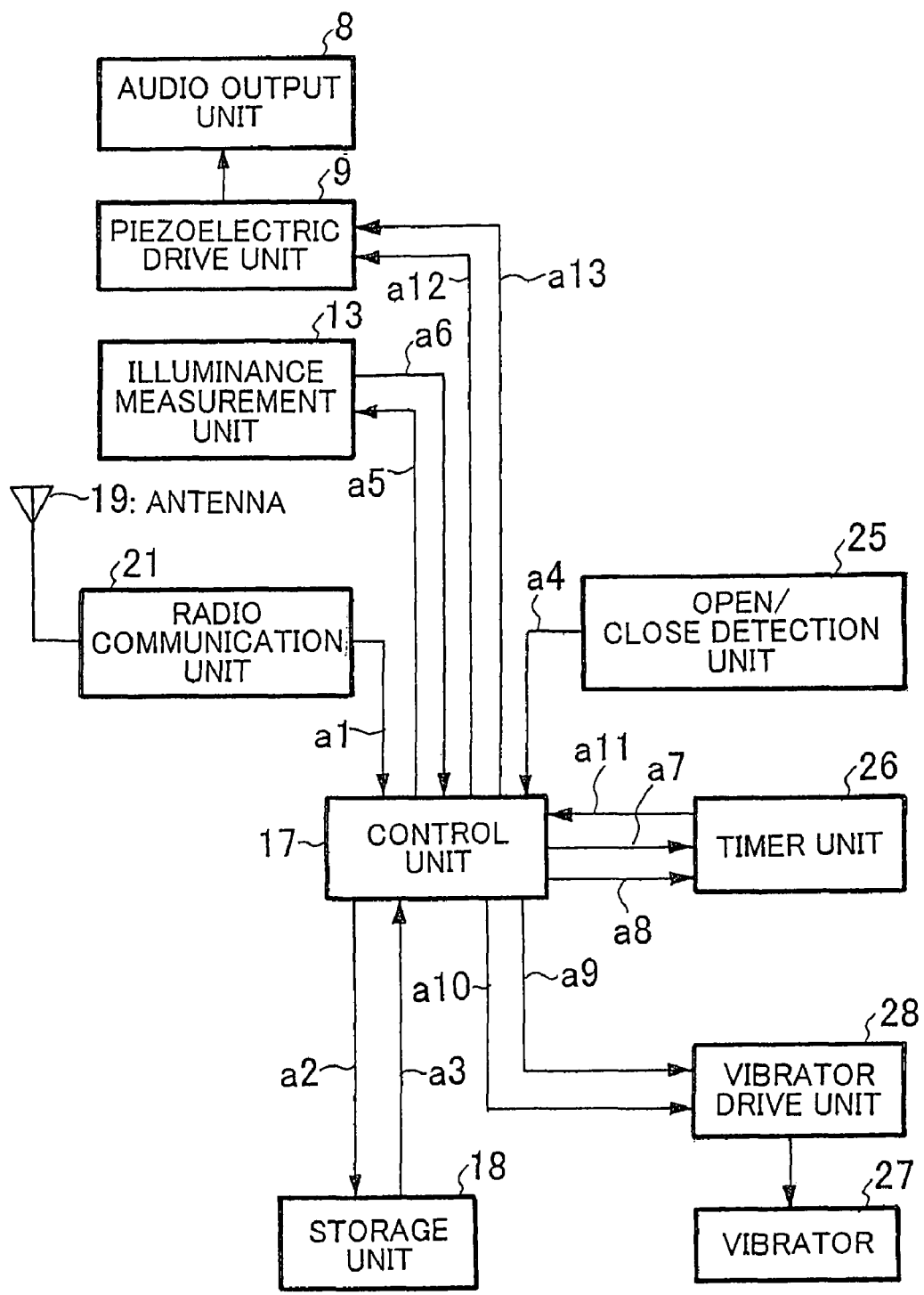
FIG. 7 shows a view to describe the performance of the mobile telephone.

FIG. 3 shows a block diagram indicative of the configuration of a mobile telephone of the first example according to the present invention, FIG. 4 shows a perspective view indicative of the configuration of the mobile telephone, FIG. 5 shows a view to describe the configuration of an audio output unit of the mobile telephone, FIG. 6 shows a flowchart to explain the performance of the mobile telephone, and FIG. 7 shows a view to describe the performance of the mobile telephone.

In this example, a mobile telephone 1 includes a housing which can be folded, and is provided with not only the original telephone call function but also the data communication function capable of transmitting and receiving an electronic mail or browsing a home page when connected to the Internet, and, as shown in FIG. 3 and FIG. 4, an upper unit 2 and a lower unit 3 are coupled mutually by a hinge unit 4 such that the mobile telephone 1 can be folded.

As shown in FIG. 3 and FIG. 4, the upper unit 2 includes, in an upper housing 6 configuring a foldable flat housing 5, an audio output unit 8 that is configured by a flat panel speaker, and, for example, outputs an earpiece sound when the user speaks over the telephone and outputs a sound when reproducing a moving image and a music composition and receiving an incoming call signal, a piezoelectric drive unit 9 that drives the audio output unit 8, a display unit 11 that is configured by a liquid crystal display on which a function setup screen, a standby screen, etc. are displayed, a light emitting unit 12 that has an LED and emits light when receiving an incoming call signal and when the user speaks over the telephone, an illuminance measurement unit 13 that outputs an illuminance measurement signal according to the illuminance in the opened state, and a magnet 14.

As shown in FIG. 3 and FIG. 4, the lower unit 3 includes, in a lower housing 16 configuring the foldable flat housing 5, a control unit 17 that controls respective units of the main body of the mobile telephone, a storage unit 18 that stores control programs to be executed by the control unit 17 and various data, a radio communication unit 21 that transmits and receives a radio wave through an antenna 19 so as to perform the telephone call processing and data communication in accordance with a predetermined protocol, an operation unit 22 that is configured by plural various operation keys etc. for inputting figures and letters, a mouthpiece unit 23 that is configured by a microphone which inputs a mouthpiece sound, a magnetic sensor 24 that is so arranged as to face the magnet 14 in the closed state, an open/close detection unit 25 that generates and outputs an open/close detection signal based on a detection signal sent from the magnetic sensor 24, a timer unit 26, a vibrator 27 that notifies the receipt of incoming call signal by generating a vibration, and a vibrator drive unit 28 that drives the vibrator 27.

The housing 5 is composed of the upper housing 6 and lower housing 16 which are mutually coupled by the hinge unit 4, and the hinge unit 4 rotatably couples the upper housing 6 and lower housing 16 such that the mobile telephone 1 can be folded. At the time of making a telephone call, the user uses the mobile telephone 1 by opening the housing 5, and setting a diaphragm 32, to be described later, of the audio output unit 8 to the user's ear, with the mouthpiece unit 23 set in close proximity to the user's mouth (speaking position).

The audio output unit 8 is configured by a flat panel speaker, and, as shown in FIG. 5, transparent members made of acrylic resin are used. The audio output unit 8 includes a diaphragm 32 that also works as a screen member for protecting a liquid crystal display panel 31, an actuator module 33 that has a piezoelectric element and vibrates the diaphragm 32 to radiate a sound wave, and a flat gasket member in the form of a frame, not shown, that prevents foreign materials such as dust from infiltrating into the inside of the upper housing 6. The actuator module 33 receives an amplified drive signal through the piezoelectric drive unit 9 controlled by the control unit 17, and converts the drive signal as an electrical signal to an acoustic signal so as to vibrate the diaphragm 32.

The display unit 11 has, for example, a liquid crystal display of the transmission type that is arranged on the inner surface of the upper housing 6. The liquid crystal display includes the liquid crystal display panel 31, a back light device that irradiates illumination light to the liquid crystal display panel 31, a drive circuit that drives the liquid crystal display panel 31, and a retention frame that retains the liquid crystal display panel 31 and back light device. The liquid crystal display panel 31 is a liquid crystal display panel of the transmission type of the TFT (Thin Film Transistor) configuration, and includes a TFT substrate on which multiple TFTs and transparent pixel electrodes are formed, a facing substrate that is so fixed as to face the TFT substrate with a clearance of several [µm] provided therebetween and has formed thereon a colored layer (color filter), a liquid crystal layer that is encapsulated in the clearance, and a pair of deflection plates which are arranged at the outside of the TFT substrate and facing substrate.

The back light device includes a light source unit as a point light source composed of a plurality of LEDs, and an optical member group having an optical waveguide plate that receives light irradiated from the light source unit and irradiates planar illumination light to the liquid crystal display panel 31, a diffusion sheet for correcting the fluctuation of brightness, and a prism sheet for condensing illumination light irradiated from the optical waveguide plate side, and irradiates illumination light to the liquid crystal display panel 31 from the back side thereof so as to make the observer watch light transmitted through the liquid crystal display panel 31.

The illuminance measurement unit 13 is configured by, for example, a photoelectric cell using silicon or selenium, and includes an optical sensor that outputs an electrical signal according to the intensity of received light, and a measurement unit that outputs an illuminance measurement signal corrected according to the illuminance in the opened state based on the output of the optical sensor.

The control unit 17 has a CPU (Central Processing Unit) etc., executes various control programs stored in the storage unit 18, controls respective units using various registers and flags reserved in the storage unit 18, carries out the communication control processing, outputs a sound by selecting the sound mode, for example, and furthermore carries out the sound and vibration generation control processing etc. that makes the vibrator 27 generate a vibration as an alarm according to need.

In the sound and vibration generation control processing, the control unit 17 selects any one sound mode from among a receiver mode (small volume sound mode) that outputs a sound with volume which is smaller than a predetermined value so as to hear a sound by setting the use's ear in close proximity to the audio output unit 8, and a speaker mode (large volume sound mode) that outputs a sound with volume which is larger than a predetermined value so as to hear a sound by setting the use's ear away from the audio output unit 8, according to the demand and situation, and makes the audio output unit 8 generate a sound. For example, the control unit 17 makes the audio output unit 8 output an earpiece sound when the user speaks over the telephone, and output a recorded sound when reproducing a message, under the receiver mode. On the other hand, the control unit 17 makes the audio output unit 8 output a sound and a music composition when reproducing a moving image and a music composition, and output a ringtone when receiving an incoming call signal, under the speaker mode.

Furthermore, in the sound and vibration generation control processing, when receiving an incoming call signal, in case it is determined that the user sets the user's ear in contact with or in close proximity to the diaphragm 32 of the audio output unit 8, the control unit 17 makes the vibrator 27 generate a vibration as an alarm to call user's attention immediately before a sound of large volume is output from the audio output unit 8. In this example, at the time of receiving an incoming call signal, in case of the opened state and in case the illuminance is equal to or less than a predetermined threshold value when calling performance setup is set to outputting a ringtone, the control unit 17 determines that the user sets the user's ear in contact with or in close proximity to the diaphragm 32 of the audio output unit 8, and makes the vibrator 27 generate a vibration as an alarm before a sound or a ringtone of large volume is output from the audio output unit 8.

Then, after the vibrator 27 is started up, in case a response is made from the user (for example, it is detected that the speaking start key of the operation unit 22 is pushed), or in case the vibrator 27 is halted after a predetermined time period required to separate the mobile telephone 1 away from the user's ear has passed over, and no response is made from the user, the control unit 17 controls the piezoelectric drive unit 9 and vibrator drive unit 28 so as to make the audio output unit 8 output a ringtone of large volume. Since the user recognizes the vibration as an alarm, when the user uses the mobile telephone 1 at the speaking position, the user separates the mobile telephone 1 away from the user's ear, which makes it possible to prevent the user from feeling uncomfortable or having the user's ear harmed due to a sound of large volume.

The storage unit 18 is configured by semiconductor memories such as a ROM and a RAM, and has a program storage area in which various control programs or a communication control program, a sound and vibration generation control program, browser, mailer, etc. to be executed by the control unit 17 are stored, and an information storage area in which various information or set up information for various functions such as the calling performance setup information (setup information whether the calling performance when receiving an incoming call signal is performed by outputting a ringtone or vibrating the vibrator 27), communication history information, telephone book information, character message information, music compositions to notify the receipt of incoming call signal to be output when receiving an incoming call signal, moving image files with sounds, etc. are stored, and the storage unit 18 has reserved therein various registers and flags to be used when the control unit 17 executes programs.

The sound and vibration generation control program has written therein a procedure that makes the audio output unit 8 output an earpiece sound when the user speaks over the telephone, and output a recorded sound when reproducing a message, under the receiver mode, and a procedure that makes the audio output unit 8 output a sound and a music composition when reproducing a moving image and a music composition, and output a ringtone when receiving an incoming call signal, under the speaker mode. Furthermore, the sound and vibration generation control program has written therein a procedure that judges whether the calling performance setup information is set to outputting a ringtone or generating a vibration in case an incoming call signal is detected, a procedure that judges whether or not the housing 5 is in the opened state based on an open/close detection signal a4 sent from the open/close detection unit 25 in case the read out calling performance setup information is set to outputting a ringtone, a procedure that sends an illuminance measurement designation signal a5 to the illuminance measurement unit 13 in case the housing 5 is in the opened state, determines that the user sets the user's ear in contact with or in close proximity to the diaphragm 32 of the audio output unit 8 in case it is detected that the illuminance is equal to or less than a predetermined threshold value based on an illuminance detection signal a6 sent from the illuminance measurement unit 13, sends a timer reset signal a7 to the timer unit 26, resets the timer unit 26, sends a timer start designation signal a8 to start up the timer unit 26, and sends a vibrator drive start signal a9 to the vibrator drive unit 28 to start up the vibrator 27, a procedure that judges whether or not a response is made from the user after the vibrator 27 is started up, judges whether or not time is up in case no response is made, receives a timer count up signal a11 from the timer unit 26, sends a vibrator drive halt signal a10 to the vibrator drive unit 28 to halt the vibrator 27 in case it is determined that a predetermined time period has passed over, and sends a speaker drive start signal a12 to the piezoelectric drive unit 9 to make the audio output unit 8 output a ringtone of large volume.

The radio communication unit 21 is composed of an RF circuit, a modem circuit, a base band processing circuit, etc., and modulates a sound or data to transmit thus generated modulated signal as a radio wave through the antenna 19, and receives a radio wave through the antenna 19 to demodulate thus received modulated signal to a sound or data, and uses thus generated sound or data to carry out the telephone call processing and data communication in accordance with a predetermined protocol.

The operation unit 22 has a functional key group including a browser mode selection key to start up the browser to browse a home page, a determination key used to determine the operation, a menu key to display an operation menu, an input mode switch key to switch the character input mode, a telephone book key to register or retrieve the telephone book, a speaking start key to perform speaking over the telephone, a clear key to return the operation to the previous state, a power key used to suspend various operations which are carried out by turning on and turning off the power, a cursor key to shift the cursor on the display screen which is displayed on the display unit 11 to the up and down as well as right and left directions, and a ten key group to input numerical characters etc.

Next, referring to FIG. 6 and FIG. 7, the mobile telephone 1 will be explained.

After the power is turned on, the control unit 17 of the mobile telephone 1 enters into a standby mode to wait for the input operation by the user or an incoming call signal. The control unit 17 monitors whether or not an incoming call signal is received (step S11 in FIG. 6), and, in case of receiving an incoming call signal a1 from the radio communication unit 21 (FIG. 7) and detecting the receipt of incoming call signal, the control unit 17 judges whether the calling performance setup information is set to outputting a ringtone or generating a vibration (step S12). That is, the control unit 17 sends a setup information read-in signal a2 to request the calling performance setup information to the storage unit 18, and receives calling performance setup information a3 from the storage unit 18.

The control unit 17 goes to step S13 in case thus read out calling performance setup information is set to outputting a ringtone, while goes to step S27 in case the calling performance setup information is set to generating a vibration. In step S13, the control unit 17 judges whether the housing 5 is in the opened state (extended state) or in the closed state (folded state) based on the open/close detection signal a4 sent from the open/close detection unit 25. The control unit 17 goes to step S14 in case of determining that the housing 5 is in the opened state, while goes to step S22 in case of determining that the housing 5 is in the closed state.

In step S14, the control unit 17 sends the illuminance measurement designation signal a5 to the illuminance measurement unit 13, and goes to step S15 in case of determining that the illuminance is equal to or less than a predetermined threshold value, while goes to step S22 in case of determining that the illuminance is more than a predetermined threshold value, based on the illuminance detection signal a6 sent from the illuminance measurement unit 13. In step S15, the control unit 17 sends the timer reset signal a7 to the timer unit 26 to reset the timer unit 26. Next, the control unit 17 sends the timer start designation signal a8 to start up the timer unit 26 (step S16), and sends the vibrator drive start signal a9 to the vibrator drive unit 28 to start up the vibrator 27 (step S17).

After starting up the vibrator, the control unit 17 judges whether or not a response is made from the user (step S18), and goes to step S19 in case no response is made, while goes to step S20 in case of detecting that the speaking start key of the operation unit 22 is pushed, and sends the vibrator drive halt signal a10 to the vibrator drive unit 28 to halt the vibrator 27, going to step S25. In step S19, the control unit 17 judges whether or not time is up, that is, whether or not a predetermined time period required to separate the mobile telephone 1 away from the user's ear has passed over since the vibrator 27 starts generating a vibration.

The control unit 17 receives the timer count up signal a11 from the timer unit 26, and goes to step S21 in case of determining that a predetermined time period has passed over, while returns to step S17 in the other cases. In step S21, the control unit 17 sends the vibrator drive halt signal a10 to the vibrator drive unit 28 to halt the vibrator 27. Next, the control unit 17 sends the speaker drive start signal a12 to the piezoelectric drive unit 9 to make the audio output unit 8 output a ringtone of large volume (step S22). The control unit 17 controls the light emitting unit 12 to make an LED emit light, and notifies the receipt of incoming call signal.

Next, judging whether or not a response is made from the user (step S23), and returning to step S22 in case no response is made, while sending a speaker drive halt signal a13 to the piezoelectric drive unit 9 in case of detecting that the speaking start key of the operation unit 22 is pushed so as to stop outputting a ringtone (step S24), going to step S25.

On the other hand, in step S27, the control unit 17 starts up the vibrator 27, and judges whether or not a response is made from the user (step S28), and returns to step S27 in case no response is made, while halts the vibrator 27 (step S29) in case of detecting that the speaking start key of the operation unit 22 is pushed, going to step S25.

In step S25, the control unit 17 starts the processing of speaking over the telephone, and a sound from the other speaking party is output from the audio output unit 8. That is, the control unit 17 controls the piezoelectric drive unit 9 such that an amplified drive signal is supplied to the actuator module 33. The actuator module 33 receives the amplified drive signal to convert thus received drive signal as an electrical signal to an acoustic signal so as to vibrate the diaphragm 32, and a sound wave is directly radiated from the diaphragm 32. The user can hear an earpiece sound at the speaking position, and can speak over the telephone by uttering a sound toward the mouthpiece unit 23. When the communication is cut off (step S26), the control unit 17 ends the processing of speaking over the telephone.

In this way, in above-described configuration, for example, even if an incoming call signal is received when the user holds the mobile telephone 1 at the speaking position and listens to a message output from the audio output unit 8, based on the illuminance detection signal a6 sent from the illuminance measurement unit 13, the control unit 17 determines that the user's ear is set in close proximity to the audio output unit 8 in case the illuminance is equal to or less than a predetermined threshold value, makes the vibrator 27 generate a vibration as an alarm to call user's attention, and makes the audio output unit 8 output a ringtone of large volume at the timing when it is assumed that the user has sufficiently separated the mobile telephone 1 away from the user's ear, which can surely protect the user's ear from a sudden large volume, improving the safety.

Furthermore, since a ringtone of large volume is output from the beginning, even if a music composition to notify the receipt of incoming call signal is used as a ringtone, the user can surely and clearly hear the sound as information to be alarmed with desirable sound quality. For example, the user can enjoy a music composition to notify the receipt of incoming call signal as a BGM of high quality, and, even if a music composition to notify the receipt of incoming call signal is set up according to the other speaking party, there is raised no fear that the user fails to hear the initial part of small volume, which problem is raised in the conventional technique in which the volume is gradually made large, bringing about no difficulty in identification.

Furthermore, by employing a flat panel speaker, the device can be reduced in thickness and size. Moreover, whether the device is used or unused by the user is judged not only by the opened/closed state of the housing but also by the measured illuminance, which can prevent outputting a vibration as an alarm unnecessarily.

Second Example

Figure 8:
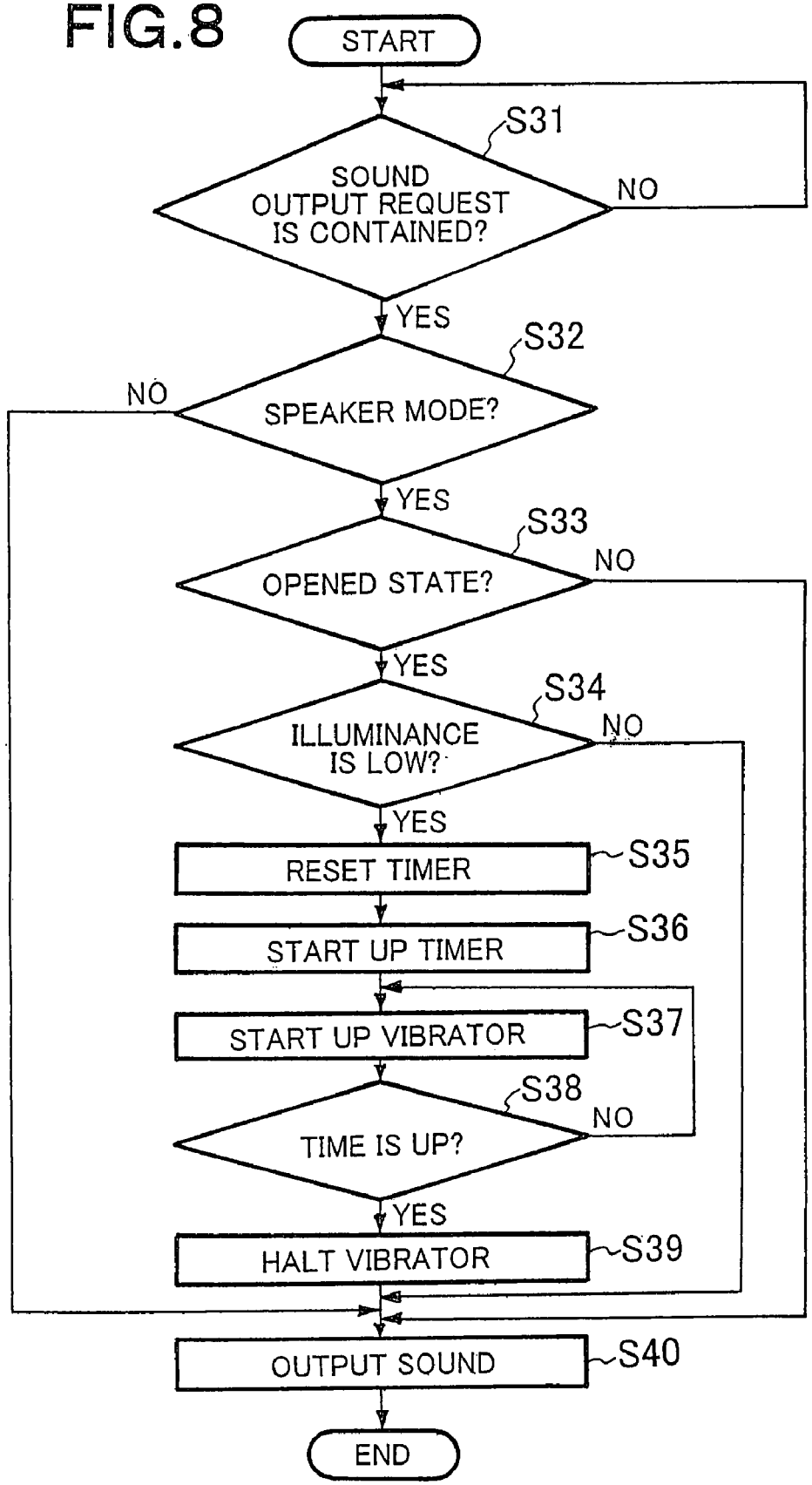
FIG. 8 shows a flowchart to describe the performance of a mobile telephone of the second example according to the present invention.

FIG. 8 shows a flowchart to describe the performance of a mobile telephone of the second example according to the present invention. The second example is largely different from the first example in that an alarm is output not only when an incoming call signal is received but also when outputting a sound is required by the user according to need. Otherwise, the configuration of the second example is substantially similar to that of the first example, and the detailed explanation of which is omitted.

In this example, in the sound and vibration generation control processing, when outputting a sound is required by the user, in case a sound is output under the speaker mode, and it is determined that the user sets the user's ear in contact with or in close proximity to the diaphragm 32 of the audio output unit 8, the control unit 17 makes the vibrator 27 generate a vibration as an alarm to call user's attention immediately before a sound of large volume is output from the audio output unit 8. Since the user receives the vibration as an alarm, in case the user sets the user's ear in close proximity to the diaphragm 32 of the audio output unit 8, and holds the mobile telephone 1 at the speaking position to confirm a sound, this performance is suspended, which makes it possible to prevent the user from feeling uncomfortable or having the user's ear harmed due to a sound of large volume.

In this example, the sound and vibration generation control program stored in the program storage area of the storage unit 18 has written therein a procedure that judges whether or not a sound output request is contained in case a predetermined program execution request is received, a procedure that judges whether or not a sound is output under the speaker mode in case it is judged that a sound output request is contained, and judges whether or not the housing 5 is in the opened state based on the open/close detection signal a4 sent from the open/close detection unit 25 in case of the speaker mode, a procedure that sends the illuminance measurement designation signal a5 to the illuminance measurement unit 13 in case it is detected that the housing 5 is in the opened state, and in case it is detected that the illuminance is equal to or less than a predetermined threshold value based on the illuminance detection signal a6 sent from the illuminance measurement unit 13, sends the timer reset signal a7 to the timer unit 26, resets the timer unit 26, sends the timer start designation signal a8 to start up the timer unit 26, and sends the vibrator drive start signal a9 to the vibrator drive unit 28 to start up the vibrator 27, a procedure that judges whether or not time is up after the vibrator 27 is started up, and a procedure that receives the timer count up signal all from the timer unit 26, sends the vibrator drive halt signal a10 to the vibrator drive unit 28 to halt the vibrator 27 in case it is determined that a predetermined time period has passed over, executes, for example, a moving image file stored in the storage unit 18, and controls the piezoelectric drive unit 9 to make the audio output unit 8 output a predetermined sound and a music composition.

Next, referring to FIG. 8, the mobile telephone 1 will be explained.

When the user opens the housing 5, and executes a program downloaded from a site (moving image file with sound, etc), in operating the operation unit 22, the control unit 17 receives a program execution request, and judges whether or not a sound output request is contained (step S31 in FIG. 8). In case of determining that a sound output request is contained, next, the control unit 17 judges whether or not a sound is output under the speaker mode (step S32). Then, the control unit 17 goes to step S33 in case of the speaker mode, while goes to step S40 in case of the receiver mode.

Then, in step S33, the control unit 17 judges whether or not the housing 5 is in the opened state based on the open/close detection signal a4 sent from the open/close detection unit 25. The control unit 17 goes to step S34 in case of determining that the housing 5 is in the opened state, while goes to step S40 in case of determining that the housing 5 is in the closed state.

In step S34, the control unit 17 sends the illuminance measurement designation signal a5 to the illuminance measurement unit 13, and goes to step S35 in case of determining that the illuminance is equal to or less than a predetermined threshold value, while goes to step S40 in case of determining that the illuminance is more than a predetermined threshold value, based on the illuminance detection signal a6 sent from the illuminance measurement unit 13. In step S35, the control unit 17 sends the timer reset signal a7 to the timer unit 26 to reset the timer unit 26. Next, the control unit 17 sends the timer start designation signal a8 to start up the timer unit 26 (step S36), and sends the vibrator drive start signal a9 to the vibrator drive unit 28 to start up the vibrator 27 (step S37). Since the user receives a vibration from the vibrator 27, in case the user sets the user's ear in close proximity to the diaphragm 32 of the audio output unit 8, and holds the mobile telephone 1 at the speaking position to confirm a sound, this performance is suspended, which makes it possible to prevent the user from feeling uncomfortable or having the user's ear harmed due to a sound of large volume.

After starting up the vibrator, the control unit 17 judges whether or not time is up, that is, whether or not a predetermined time period required to separate the mobile telephone 1 away from the user's ear has passed over since the vibrator 27 starts generating a vibration.

The control unit 17 receives the timer count up signal all from the timer unit 26, and goes to step S39 in case of determining that a predetermined time period has passed over, while returns to step S37 in the other cases. In step S39, the control unit 17 sends the vibrator drive halt signal a10 to the vibrator drive unit 28 to halt the vibrator 27. Next, the control unit 17 executes, for example, a moving image file stored in the storage unit 18, and controls the piezoelectric drive unit 9 to make the audio output unit 31 output a predetermined sound and a music composition (step S40), making the display unit 11 display an image (moving image).

The control unit 17 controls the piezoelectric drive unit 9 such that an amplified drive signal is supplied to the actuator module 33. The actuator module 33 receives the amplified drive signal to convert thus received drive signal as an electrical signal to an acoustic signal so as to vibrate the diaphragm 32. Then, a sound wave is directly radiated from the diaphragm 32. The user can watch the display screen of the display unit 11. In addition to the case of executing a program downloaded from a site (moving image file with sound, etc), for example, in case of using the mail read out function, a sound is radiated from the diaphragm 32.

In this way, in above-described configuration, since the user receives a vibration from the vibrator 27, in case the user sets the user's ear in close proximity to the diaphragm 32 of the audio output unit 8, and holds the mobile telephone 1 at the speaking position to confirm a sound, this performance is suspended, which makes it possible to surely protect the user's ear from a sudden large volume and enable the user to surely and clearly hear a sound as information to be alarmed. For example, in case of reproducing and outputting a downloaded music composition, there is raised no fear that the user fails to hear the initial part of small volume, which problem is brought about in the conventional technique in which the volume is gradually made large.

Furthermore, by employing a flat panel speaker, the device can be reduced in thickness and size. Moreover, whether the device is used or unused by the user is judged not only by the opened/closed state of the housing but also by the measured illuminance, which can prevent outputting a vibration as an alarm unnecessarily.

Third Example

Figure 9:
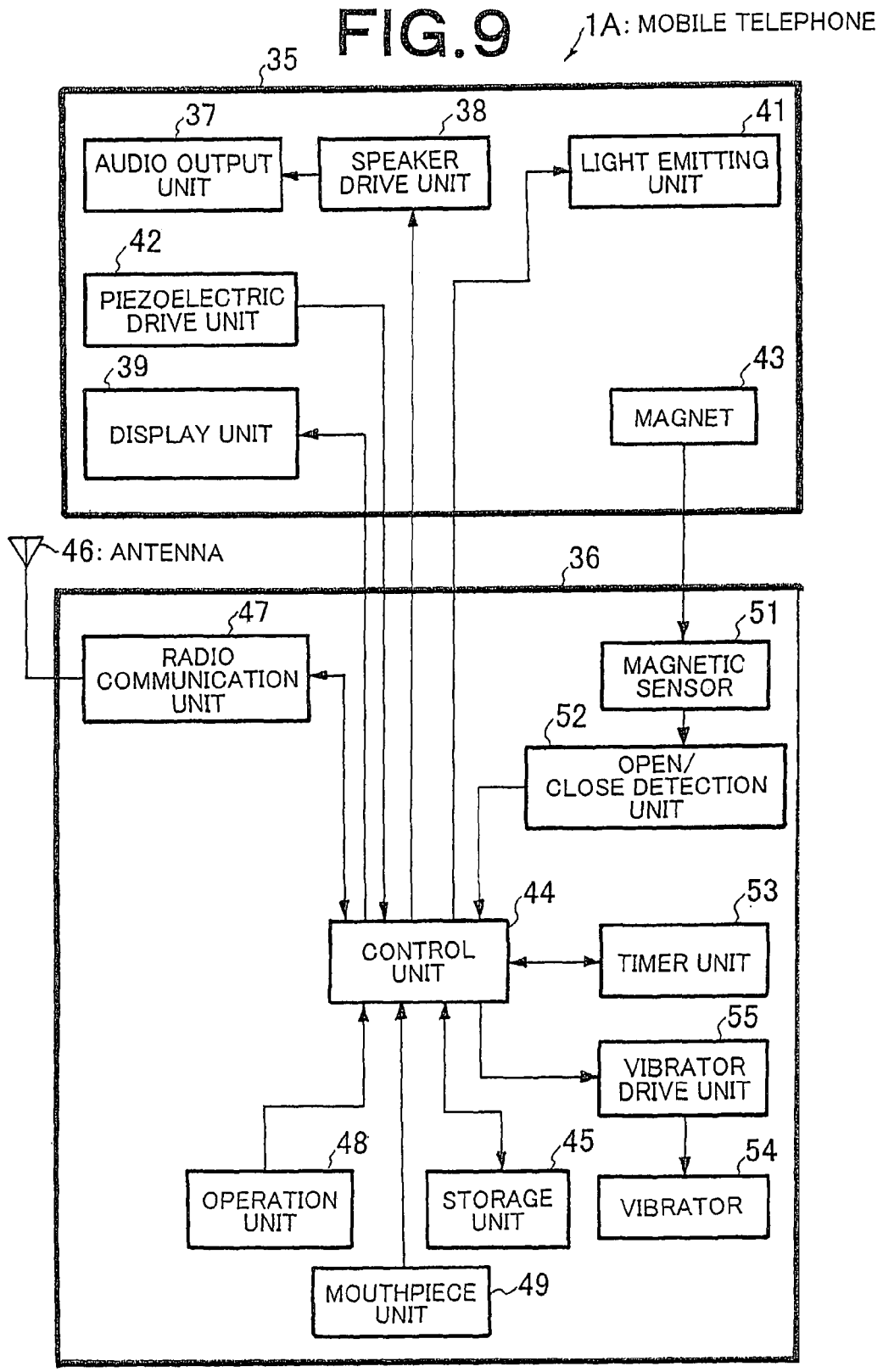
FIG. 9 shows a block diagram indicative of the configuration of a mobile telephone of the third example according to the present invention.

FIG. 9 shows a block diagram indicative of the configuration of a mobile telephone of the third example according to the present invention. The third example is largely different from the first example in that an audio output unit provided with a function of outputting an earpiece sound as well as a function of outputting a ringtone etc. is arranged instead of a flat panel speaker, and in that a pressure measurement unit is arranged instead of the illuminance measurement unit. Otherwise, the configuration of the third example is substantially similar to that of the first example, and the detailed explanation of which is omitted.

In this example, as shown in FIG. 9, a mobile telephone 1A includes an upper unit 35 and a lower unit 36 which are coupled mutually by a hinge unit such that the mobile telephone 1A can be folded. The upper unit 35 includes, in an upper housing, for example, an audio output unit 37 that outputs an earpiece sound when the user speaks over the telephone and outputs a sound when reproducing a moving image and a music composition, and outputs a ringtone when receiving an incoming call signal, a speaker drive unit 38 that drives the audio output unit 37, a display unit 39, a light emitting unit 41, a pressure measurement unit 42 that detects pressing force when the display screen is pressed, and a magnet 43. The pressure measurement unit 42 has a pressure sensor configured by a piezoelectric element etc. which is arranged on the back side of a liquid crystal display panel (for example, between a retention frame and an optical waveguide plate), and a measurement unit that outputs a pressure measurement signal based on an output signal from the pressure sensor.

As shown in FIG. 9, the lower unit 36 includes, in a lower housing, a control unit 44, a storage unit 45, an antenna 46, a radio communication unit 47, an operation unit 48, a mouthpiece unit 49, a magnetic sensor 51, an open/close detection unit 52, a timer unit 53, a vibrator 54, and a vibrator drive unit 55.

In above-described configuration, effects similar to those in the first example can be obtained.

Fourth Example

Figure 10:
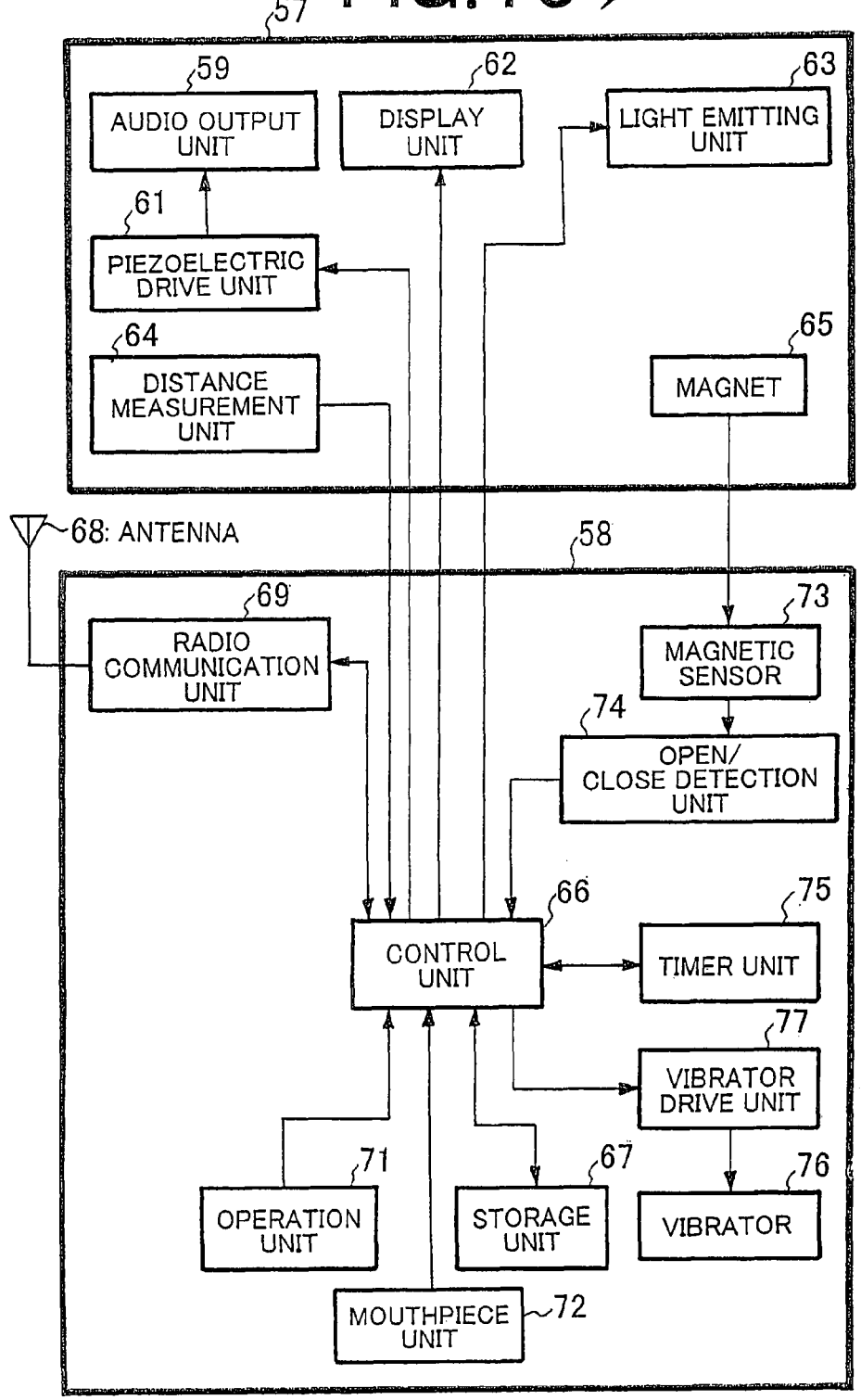
FIG. 10 shows a block diagram indicative of the configuration of a mobile telephone of the fourth example according to the present invention.
Figure 11:
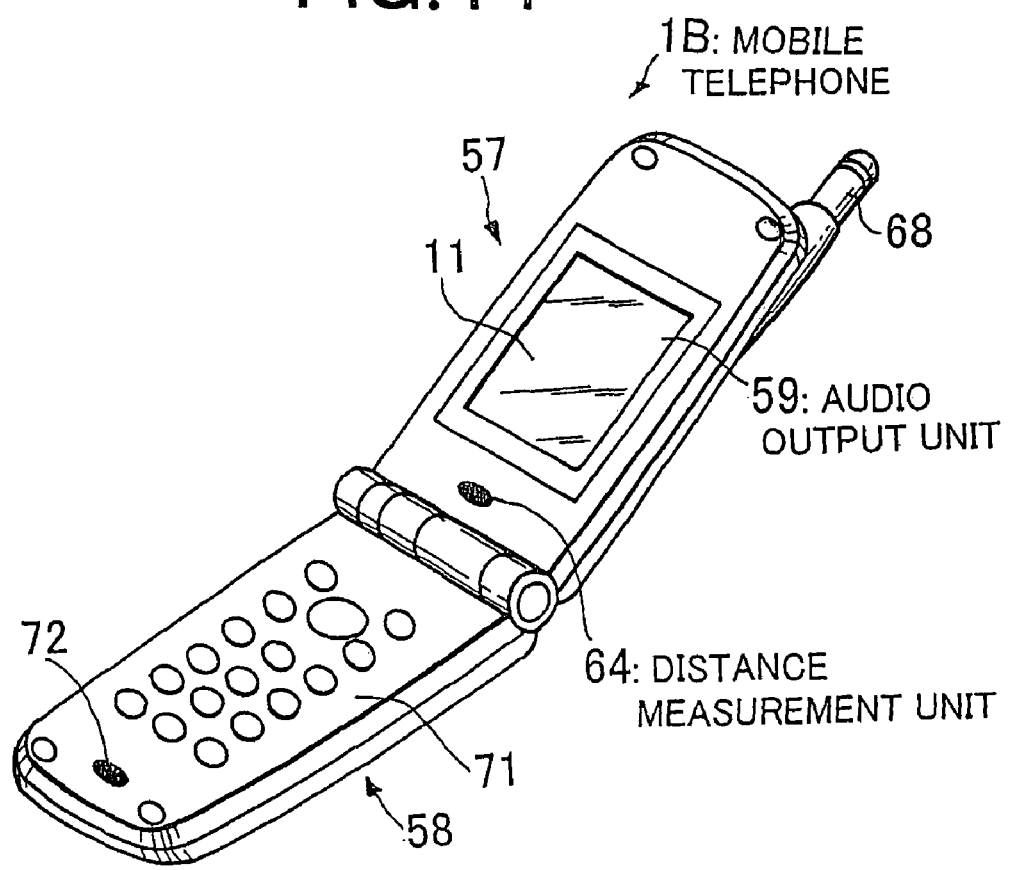
FIG. 11 shows a perspective view indicative of the configuration of the mobile telephone of the fourth example.

FIG. 10 shows a block diagram indicative of the configuration of a mobile telephone of the fourth example according to the present invention, and FIG. 11 shows a perspective view indicative of the configuration of the mobile telephone. The fourth example is largely different from the first example in that a distance measurement unit is arranged instead of the illuminance measurement unit. Otherwise, the configuration of the fourth example is substantially similar to that of the first example, and the detailed explanation of which is omitted.

In this example, as shown in FIG. 10 and FIG. 11, a mobile telephone 1B includes an upper unit 57 and a lower unit 58 which are coupled mutually by a hinge unit such that the mobile telephone 1B can be folded. The upper unit 57 includes, in an upper housing, an audio output unit 59 that is configured by a flat panel speaker, and, for example, outputs an earpiece sound when the user speaks over the telephone and outputs a sound when reproducing a moving image and a music composition, and outputs a ringtone when receiving an incoming call signal, a piezoelectric drive unit 61 that drives the audio output unit 59, a display unit 62, a light emitting unit 63, a distance measurement unit 64 that detects the distance from its setup position to a nearby object to be measured as the distance from the audio output unit 59 to the user's ear, and a magnet 65. The distance measurement unit 64 in this example irradiates infrared ray, receives returning infrared ray reflected by an object to be measured, and measures the distance from the outgoing (incoming) point of infrared ray to a nearby object to be measured based on the difference between the outgoing timing and the incoming timing of infrared ray.

As shown in FIG. 10 and FIG. 11, the lower unit 58 includes, in a lower housing, a control unit 66, a storage unit 67, an antenna 68, a radio communication unit 69, an operation unit 71, a mouthpiece unit 72, a magnetic sensor 73, an open/close detection unit 74, a timer unit 75, a vibrator 76, and a vibrator drive unit 77.

In above-described configuration, effects similar to those in the first example can be obtained.

Fifth Example

Figure 12:
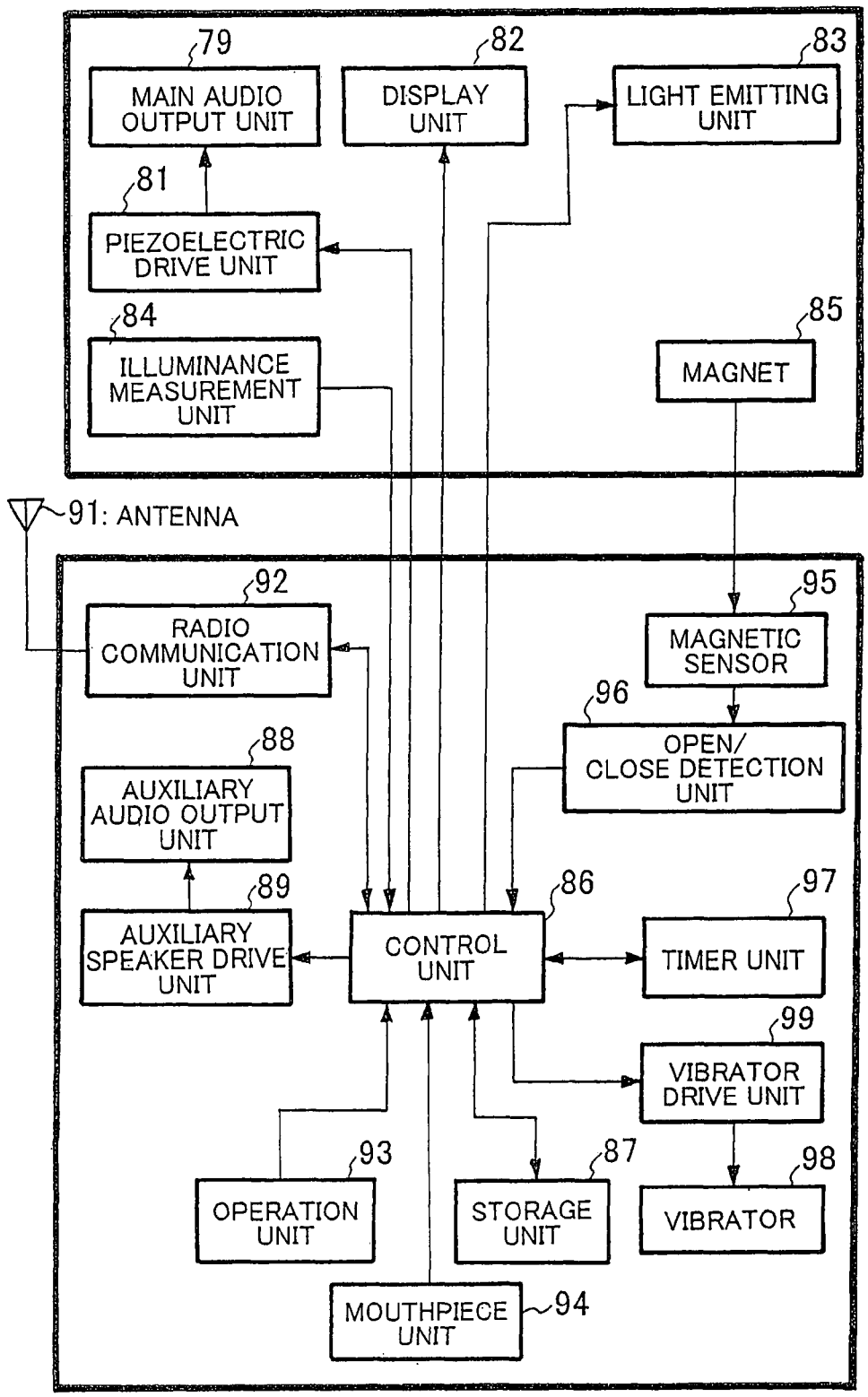
FIG. 12 shows a block diagram indicative of the configuration of a mobile telephone of the fifth example according to the present invention.

FIG. 12 shows a block diagram indicative of the configuration of a mobile telephone of the fifth example according to the present invention. The fifth example is largely different from the first example in that an auxiliary audio output unit for outputting a ringtone is additionally arranged. Otherwise, the configuration of the fifth example is substantially similar to that of the first example, and the detailed explanation of which is omitted.

In this example, as shown in FIG. 12, a mobile telephone 1C has an upper unit that includes, in an upper housing, a main audio output unit 79 that is configured by a flat panel speaker, and, for example, outputs an earpiece sound when the user speaks over the telephone and outputs a sound when reproducing a moving image and a music composition, a piezoelectric drive unit 81 that drives the main audio output unit 79, a display unit 82, a light emitting unit 83, an illuminance measurement unit 84, and a magnet 85.

As shown in FIG. 12, a lower unit includes, in a lower housing, a control unit 86, a storage unit 87, an auxiliary audio output unit 88 that outputs a ringtone when receiving an incoming call signal, an auxiliary speaker drive unit 89 that drives the auxiliary audio output unit 88, an antenna 91, a radio communication unit 92, an operation unit 93, a mouthpiece unit 94, a magnetic sensor 95, an open/close detection unit 96, a timer unit 97, a vibrator 98, and a vibrator drive unit 99.

In above-described configuration, effects similar to those in the first example can be obtained. Especially, as an electro-acoustic transducer of multi sound modes provided with a function of outputting an earpiece sound as well as a function of outputting a ringtone etc., as has been described in the first example and second example, a flat panel speaker using the same parts may be employed as an electro-acoustic transducer, and as has been described in the third example, an audio output unit as an electro-acoustic transducer that is configured by uniting two kinds of electro-acoustic transducers which are disclosed in the Patent Document 1 may be employed, and furthermore, a configuration in which a main audio output unit and an auxiliary audio output unit as two kinds of electro-acoustic transducers or an electro-acoustic transducer radiating a sound wave of large volume and an electro-acoustic transducer radiating a sound wave of small volume are arranged in the same housing may be employed. In this case, the main audio output unit and the auxiliary audio output unit, as a part for receiver and a part for speaker respectively, do not have to be separately arranged necessarily with respect to one another, which can improve the degree of freedom in design.

Sixth Example

The sixth example is largely different from the first example in that, when detecting the receipt of incoming call signal, it is judged whether or not the user holds the mobile telephone 1 at the speaking position depending on whether or not a sound is being output. Otherwise, the configuration of the sixth example is substantially similar to that of the first example, and the detailed explanation of which is omitted.

The control unit 17 monitors whether or not an incoming call signal is received, and, in case an incoming call signal is detected, judges whether or not a sound is being output, that is, whether or not the audio output unit 8 is currently outputting a sound. In case a sound is being output, and, for example, in case the user holds the mobile telephone 1 at the speaking position, and a message is output from the audio output unit 8, the control unit 17 sends the vibrator drive start signal a9 to the vibrator drive unit 28 to drive the vibrator 27 for a predetermined time period, and then makes the audio output unit 8 output a ringtone. In the other cases, the control unit 17 immediately makes the audio output unit 8 output a ringtone without starting up the vibrator 27.

In above-described configuration, effects similar to those in the first example can be obtained. In addition, a sensor etc. for detection can be removed, which can reduce the device in size and weight and can lower the cost.

While the present invention has been described in accordance with the certain preferred examples with reference to the accompanying drawings in detail, it should be understood that the present invention is not limited to these examples, but various modifications, alternative constructions or equivalents can be implemented without departing from the scope and spirit of the present invention. For example, in above-described examples, a vibration as an alarm is generated using a vibrator. On the other hand, instead of or in addition to generating a vibration, light (stroboscopic light or light for illumination display) as an alarm may be emitted using a light emitting unit. In this case, the intensity or pattern (ON/OFF pattern etc.) of vibration and light may be changed according to the degree, kind, etc. of the volume of an acoustic signal (sound wave) which is to be output immediately afterward.

Furthermore, the intensity of vibration and light may be made large gradually. Vibration generation and light emission may be carried out in conjunction with each other such that, for example, light emission is set on when vibration generation is set off. Vibration generation and light emission may be performed before generating a ringtone irrespective of the detection of the close proximity of the user's ear to the device. Vibration generation and light emission may be stopped by the confirmation operation by the user. Alternatively, as an unexpected interrupt, for example, output etc. of such as a music composition in accordance with a schedule set up in advance may be contained except at the time of receiving an incoming call signal. Without restricting the situation to the time point of receiving an incoming call signal, for example, application to the case in which an alarm is generated according to the remaining amount of battery may be employed. Furthermore, at the time of setting up a ringtone, so as to avoid vibration generation which may be undesirable for the user, this setup may be removed by default. That is, this function can be made void and of no effect without the setup by the user.

Furthermore, an electronic camera unit may be additionally arranged such that the image pickup function and the visual telephone function may be provided. In this case, the detection of the close proximity of the user's ear to the device may be detected by picking up an image using an electronic camera. Moreover, the illuminance measurement unit and distance measurement unit may be arranged at plural points. At the time of picking up an image, a pseudo shutter sound may be generated from the audio output unit. A plurality of kinds of sensors may be combined to be used.

Furthermore, in the first example, the mobile telephone 1 does not have to be used at the speaking position necessarily. That is, by employing a flat panel speaker, even if the diaphragm 32 is not set to the user's ear, the user can hear an earpiece sound with the mobile telephone 1 directed toward the user. Accordingly, the sound does not come to be unclear due to the deviation from the sound hole position, which problem is raised in the conventional technique, and an earpiece sound can be surely and clearly heard, and the user can speak over the telephone by uttering a sound toward the mouthpiece unit 23 with the mobile telephone 1 separated away from the user's ear. In case an image (moving image or still image) is added, the user can watch the display screen of the display unit 11 and concurrently hear a sound.

Furthermore, in the first example, the magnet and magnetic sensor may be removed by detecting the opened/closed state by measuring the illuminance. Moreover, in the third example, a pressure sensor is arranged on the back side of the liquid crystal display panel. On the other hand, a pressure sensor may be arranged on the lateral side of the housing. Moreover, also in the third example, a flat panel speaker may be used.

Furthermore, the mode does not have to be restricted to the two modes or the receiver mode and speaker mode, and the mode may be switched among three modes or more whose volumes are different from each other. An output from a buzzer or a bell as an object to be alarmed may be contained. The present invention can be applied to the case in which an earphone or a headphone is used. The present invention can also be applied to the case in which a headset having mounted thereon a microphone is used.

The display unit is not restricted to a liquid crystal display panel, and may be a self-luminous optical display using LED. Furthermore, a display using electroluminescence elements may be employed, and a display using a reflection type mirror device such as a DMD (digital micromirror device) may be employed. The present invention is not restricted to a folding type mobile telephone which can be simply opened and closed, and may be applied to a mobile telephone having two hinges whose upper unit and lower unit can be opened and closed with respect to each other, and one of the units is pivotably coupled to the other unit around a pivot axis that is perpendicular to another pivot axis for opening and closing the upper unit and lower unit, and may also be applied to a straight type mobile telephone other than the folding type mobile telephone.

INDUSTRIAL APPLICABILITY

The present invention can be applied to, as a portable audio output device, a personal handyphone system (PHS) terminal, a personal digital assistant (PDA), and a portable computer, in addition to a mobile telephone. The present invention can also be applied to, as an audio output device, a display, an acoustic device, a personal computer, etc. having an audio output unit.

The invention claimed is:

1. An audio output device provided with an electro-acoustic transducer that converts an electrical signal to a sound wave and radiates thus generated sound wave, comprising:
    a sound controller configured to control the electro-acoustic transducer under any one sound mode of a small volume sound mode that outputs a sound with volume which is smaller than a predetermined value so as to hear a sound by setting the user's ear in close proximity to the electro-acoustic transducer, or a large volume sound mode that outputs a sound with volume which is larger than a predetermined value so as to hear a sound by setting the user's ear away from the electro-acoustic transducer; and
    an alarm output unit configured to, before radiating a sound wave from the electro-acoustic transducer under the large volume sound mode, output an alarm to call user's attention so as to protect the user's ear.

2. The audio output device according to claim 1, further comprising:
    a proximity detector configured to detect the contact or close proximity within a range equal to or less than a predetermined distance of the ear with respect to the electro-acoustic transducer; and
    a proximity judgment unit configured to, based on the detection result by the proximity detector, judge whether or not the ear is in the proximity state under which the ear is in contact or in close proximity within a range equal to or less than a predetermined distance with respect to the electro-acoustic transducer;

wherein, in case it is determined that the ear is in the proximity state with respect to the electro-acoustic transducer, before radiating a sound wave from the electro-acoustic transducer under the large volume sound mode, the alarm output unit outputs an alarm to call the user's attention so as to protect the ear.

3. The audio output device according to claim 2, wherein, in case a sound wave is radiated from the electro-acoustic transducer under the small volume sound mode, the proximity judgment unit determines that the ear is in the proximity state with respect to the electro-acoustic transducer.

4. The audio output device according to claim 2, wherein the proximity detector includes at least one of
an illuminance measurement unit provided with an optical sensor for measuring the illuminance of the proximity of the electro-acoustic transducer,
a distance measurement unit configured to measure the distance from its setup position to a nearby object to be measured as the distance from the electro-acoustic transducer to the ear, and
a pressure detector configured to detect pressing force.

5. The audio output device according to claim 2, which is of the folding type, and includes an open/close detector configured to detect the opened/closed state,
wherein, in case the opened state is detected by the open/close detector, based on the detection result by the proximity detector, the proximity judgment unit judges whether the ear is in the proximity state or in the non-proximity state with respect to the electro-acoustic transducer.

6. The audio output device according to claim 1, further comprising:
a drive controller configured to, after a predetermined time period has passed over since the alarm output unit starts outputting an alarm, drive the alarm output unit and the electro-acoustic transducer so as to make the electro-acoustic transducer radiate a sound wave of large volume.

7. The audio output device according to claim 1, wherein the alarm output unit includes at least one of a vibration generator configured to generate a vibration and a light emission unit configured to emit light.

8. The audio output device according to claim 1, wherein the electro-acoustic transducer comprises a flat panel speaker that radiates a sound wave by vibrating a diaphragm using an actuator.

9. The audio output device according to claim 8, wherein the actuator comprises a piezoelectric element, and is in contact with a predetermined position of the diaphragm.

10. The audio output device according to claim 8, further comprising:
a display unit configured to display characters or images, wherein the diaphragm is configured by a transparent member, and also works as a screen member for protecting the surface of the display unit.

11. The audio output device according to claim 1, further comprising:
a communication unit configured to perform the telephone call;
wherein the electro-acoustic transducer outputs an earpiece sound as a sound wave of the small volume sound mode.

12. An alarm output control method in an audio output device provided with an electro-acoustic transducer that converts an electrical signal to a sound wave and radiates thus generated sound wave, comprising:

a sound control step of controlling the electro-acoustic transducer under any one sound mode of a small volume sound mode that outputs a sound with volume which is smaller than a predetermined value so as to hear a sound by setting the user's ear in close proximity to the electro-acoustic transducer, or a large volume sound mode that outputs a sound with volume which is larger than a predetermined value so as to hear a sound by setting the user's ear away from the electro-acoustic transducer; and
an alarm output step of, before radiating a sound wave from the electro-acoustic transducer under the large volume sound mode, outputting an alarm to call user's attention so as to protect the user's ear.

13. The alarm output control method in an audio output device according to claim 12, further comprising:
a proximity detection step of detecting the contact or close proximity within a range equal to or less than a predetermined distance of the ear with respect to the electro-acoustic transducer; and
a proximity judgment step of, based on the detection result in the proximity detection step, judging whether or not the ear is in the proximity state under which the ear is in contact or in close proximity within a range equal to or less than a predetermined distance with respect to the electro-acoustic transducer;
wherein, in case it is determined that the ear is in the proximity state with respect to the electro-acoustic transducer, before radiating a sound wave from the electro-acoustic transducer under the large volume sound mode, the alarm output step outputs an alarm to call the user's attention so as to protect the ear.

14. The alarm output control method in an audio output device according to claim 13, wherein, in case a sound wave is radiated from the electro-acoustic transducer under the small volume sound mode, the proximity judgment step determines that the ear is in the proximity state with respect to the electro-acoustic transducer.

15. The alarm output control method in an audio output device according to claim 13, wherein the proximity detection step uses at least one of
illuminance measurement means provided with an optical sensor for measuring the illuminance of the proximity of the electro-acoustic transducer,
distance measurement means for measuring the distance from its setup position to a nearby object to be measured as the distance from the electro-acoustic transducer to the ear, and
pressure detection means for detecting pressing force.

16. The alarm output control method in an audio output device according to claim 12, wherein the alarm output step controls such that, after a predetermined time period has passed over since outputting an alarm is started, the electro-acoustic transducer radiates a sound wave of large volume.

17. The alarm output control method in an audio output device according to claim 12, wherein the alarm output step performs at least one of generating a vibration to output an alarm and emitting light to output an alarm.

18. An alarm output control program in an audio output device provided with an electro-acoustic transducer that converts an electrical signal to a sound wave and radiates thus generated sound wave, the program making a computer execute functions comprising:
a sound control function of controlling the electro-acoustic transducer under any one sound mode of a small volume sound mode that outputs a sound with volume which is smaller than a predetermined value so as to hear a sound by setting the user's ear in close proximity to the electro-acoustic transducer, or a large volume sound mode that outputs a sound with volume which is larger than a predetermined value so as to hear a sound by setting the user's ear away from the electro-acoustic transducer; and an alarm output function of, before radiating a sound wave from the electro-acoustic transducer under the large volume sound mode, outputting an alarm to call user's attention so as to protect the user's ear.

19. The alarm output control program in an audio output device according to claim 18, the program further making a computer execute functions comprising:

a proximity detection function of detecting the contact or close proximity within a range equal to or less than a predetermined distance of the ear with respect to the electro-acoustic transducer; and a proximity judgment function of, based on the detection result in the proximity detection function, judging whether or not the ear is in the proximity state under which the ear is in contact or in close proximity within a range equal to or less than a predetermined distance with respect to the electro-acoustic transducer;

wherein, in case it is determined that the ear is in the proximity state with respect to the electro-acoustic transducer, before radiating a sound wave from the electro-acoustic transducer under the large volume sound mode, the alarm output function outputs an alarm to call the user's attention so as to protect the ear.

20. The alarm output control program in an audio output device according to claim 19, wherein, in case a sound wave is radiated from the electro-acoustic transducer under the small volume sound mode, the proximity judgment function determines that the ear is in the proximity state with respect to the electro-acoustic transducer.

21. The alarm output control program in an audio output device according to claim 18, wherein the alarm output function controls such that, after a predetermined time period has passed over since outputting an alarm is started, the electro-acoustic transducer radiates a sound wave of large volume.

22. An audio output device provided with an electro-acoustic transducer that converts an electrical signal to a sound wave and radiates thus generated sound wave, comprising:

sound control means for controlling the electro-acoustic transducer under any one sound mode of a small volume sound mode that outputs a sound with volume which is smaller than a predetermined value so as to hear a sound by setting the user's ear in close proximity to the audio output device, or a large volume sound mode that outputs a sound with volume which is larger than a predetermined value so as to hear a sound by setting the user's ear away from the audio output device; and alarm output means for, before radiating a sound wave from the electro-acoustic transducer under the large volume sound mode, outputting an alarm to call user's attention so as to protect the user's ear.

* * * * *